July 5, 1955
D. K. JOVANOVICH
2,712,356
ROTOR BLADE FOR HELICOPTERS
Filed May 28, 1951
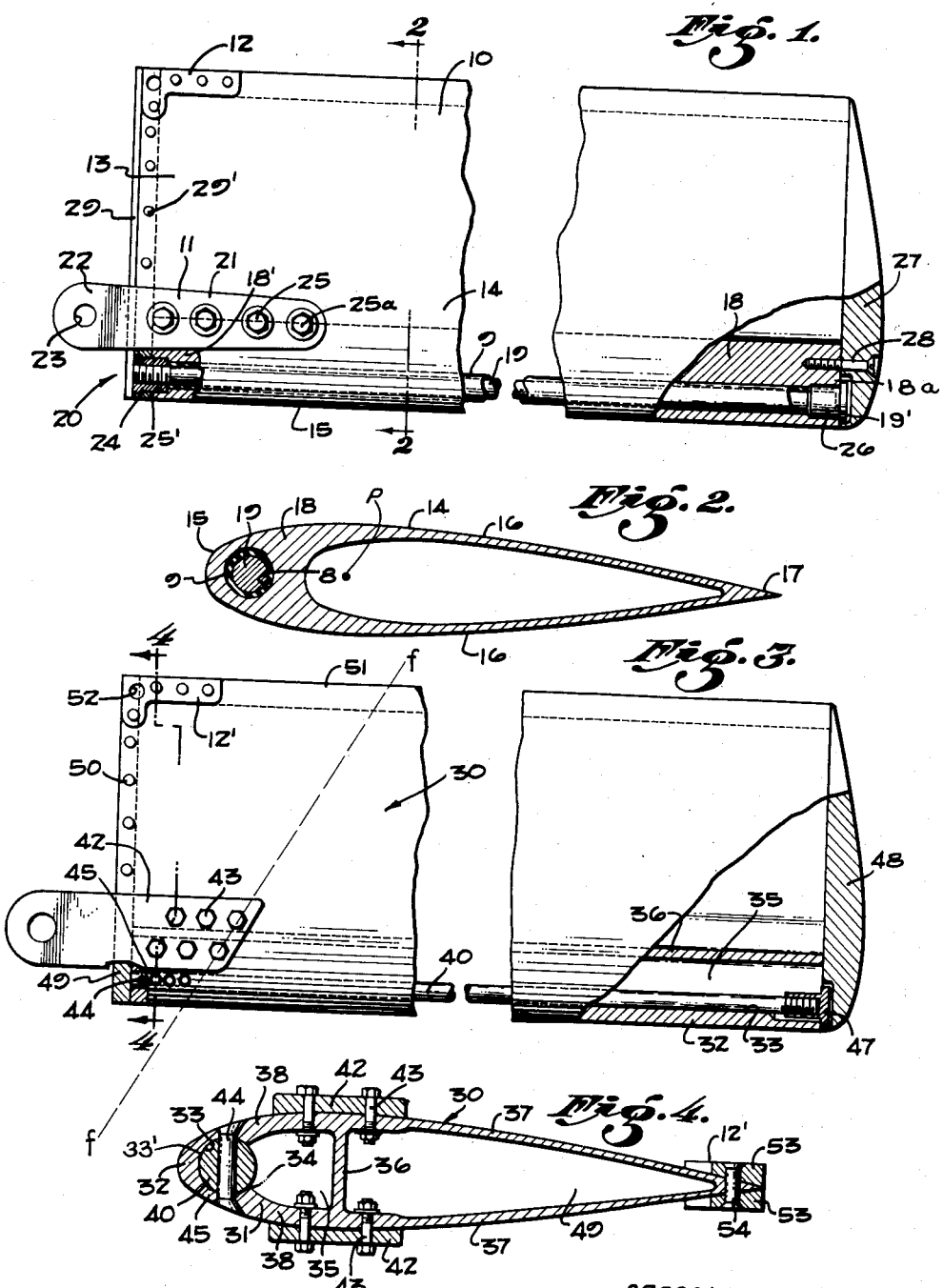
DRAGOLJUB K. JOVANOVICH,
INVENTOR.
BY
ATTORNEY

United States Patent Office 2,712,356
Patented July 5, 1955

2,712,356

ROTOR BLADE FOR HELICOPTERS

Dragoljub K. Jovanovich, Redondo Beach, Calif., assignor to McCulloch Motors Corporation, Los Angeles, Calif., a corporation of Wisconsin Application May 23, 1951, Serial No. 228,602

6 Claims. (Cl. 170—159)

This invention relates to rotors for use on aircraft as propelling or supporting means and comprises a simple and inexpensive blade for such rotors.

It is an object of the invention to provide a rotor blade comprising a metal extrusion and which is of such strength as to withstand all loads imposed thereon and in which all of the parts of the blade have structural utility, there being no utilization of dead weight solely for balancing purposes.

It is an object of the invention to provide a blade body extruded from lightweight metal such as aluminium or magnesium or alloys thereof and having near the leading edge thereof a balancing rod of heavy high strength metal which is also capable of taking and is connected so as to take the centrifugal loads in the blade in case of failure of the lightweight metal body of the blade.

It is a further object of the invention to provide for this rotor blade a lightweight metal extrusion having a lengthwise slot or opening to receive a balancing and tension rod, and in which slot or opening the balancing or tension rod is elastically bonded to the extrusion whereby centrifugal forces incurred in the blade will be carried by the balancing rod, thereby relieving the lightweight structure of the extrusion from concentrations of force which would cause rupture thereof as a result of application of centrifugal forces.

A further object of the invention is to provide a rotor blade structure having an outer body of lightweight relatively low strength material and a tension rod of relatively high strength material in the leading edge portion thereof, wherein the inner end of the lightweight blade section is mechanically connected to the balancing rod.

A feature of the applicant's construction is that the inner ends of the blade section and the balancing rod are mechanically connected through a root fitting with the rotatable supporting means from which the blades rotate. In the preferred from of the invention the mechanical connection of the balancing rod with the root fitting is through a portion of the inner end of the blade section, which portion represents any mechanical device which might be employed to connect the inner end of the balancing rod to the root fittings.

Further objects and advantages of the invention will be brought out in the following specification describing preferred embodiments of the invention, and wherein explanation of small details of construction is for the purpose of completeness of disclosure without limiting the invention set forth in the appended claims.

Referring to the drawing which is for illustrative purposes only:

Fig. 1 is a fragmentary plan view of a rotor blade embodying my invention;

Fig. 2 is an enlarged section taken on the plane indicated by the line 2—2 of Fig. 1;

Fig. 3 is a fragmentary plan view of an alternative rotor blade embodying the invention;

Fig. 4 is an enlarged cross-section taken as indicated at the line 4—4 of Fig. 3.

In Figs. 1 and 2, I show a rotor blade especially adapted for use in rotors of helicopters. This rotor blade 10 is of constant cross-section throughout its length and at its inner end has connector means 11 and 12 whereby the inner end 13 of the blade may be connected to the rotatable supporting means (not shown).

The blade 10 comprises a hollow blade body 14 having a rounded leading edge 15 and vertically spaced side walls 16 which come together to form a trailing edge 17 for the blade 10. The elongated hollow blade body 14 is formed from a lightweight material and in the embodiment shown, this blade body 14 is an extrusion of lightweight metal such as aluminium, magnesium or an alloy thereof. In the process of extruding the blade body 10, an internal thickened or solid leading edge portion 18 is integrally formed within the blade body 10 in a position along the leading edge of the extrusion, this solid leading edge portion 18 being disposed between the leading edge 15 and the center of the pressure of the airfoil section defined by the body 10. A slender balancing rod member 19 of relatively heavy metal, as compared to the lightweight metal of the extrusion 14 is disposed longitudinally of the extrusion 14 in offset relation to the center pressure P. This balancing rod 19 is placed as close as possible to the leading edge 15 and is therefore embedded in the forward portion of the portion 18 to bring the center of gravity of the blade forward. This balancing rod is connected to the extrusion 14 and is of such tensile strength as to be capable of carrying all of the tensile forces incurred longitudinally in the blade 10 due to the operation of centrifugal force resulting from the rotation of the blade 10 around the rotatable supporting means to which it is connected. The rod 19 is connected to the extrusion 14 by an elastic bonding material 9 and should any transverse weakness occur in the extrusion, which weakness would result in a failure when centrifugal and other forces are applied to the blade 10, the balancing rod will prevent such failure of the blade in view of the fact that the forces which might produce the failure are transmitted to the rod 19 and are carried thereby instead of by the extrusion 18.

The blade section 14 has therein a spanwise opening or internal channel 8 which is of slightly larger diameter than the balancing rod 19, so that a tubular space will exist around the rod 19 to accommodate the layer of bonding material.

Means 20 are provided for connecting the front or inner end of the balancing rod 19 to the rotatable supporting member of the helicopter, so that the tensile stresses carried by the rod 19 will be transmitted directly to the rotatable supporting means. The connecting means 20 employs a part of the metal of the extruded section 14. This will be perceived from the following. The connecting means 11 comprise root fitting or plates 21 which are bolted to the inner or front end 13 of the section 14, adjacent the leading edge 15 and having projecting ends 22 with aligned openings 23 to receive a connecting pin. A nut 24, received in a counterbore 25' in the metal portion 18 of the section 14, is threaded on the inner end of the rod 19 to provide a connecting means whereby the tensile forces in the rod 19 will be transmitted to the metal specifically indicated by the numeral 18', of the section 14 which lies between the nut member 24 and the bolts 25 which secure the root fittings 21. Rupture of the section 14 might occur rightward of the bolt indicated at 25a. The remaining bolts 25, however, lie to the left of the bolt 25a and will receive the load transmitted from the leftward end of the rod 19 and the nut 24 to the metal portion 18'. A similar cap or nut 26 is threaded on to the outer end of the rod 19 and provides a radial shoulder 19' for engaging the radial shoulder 18a formed by the outer end of the extrusion 14. The head of this member 26 is covered by a fairing cap 27 which may be secured by screw means 28. The inner end of the plate section 14 is closed by an inner end cap 29 which may be secured by rivets 29'.

In Fig. 3, I have shown a rotor blade extrusion 30 adapted to receive a balancing rod. It has an internal thickening 31 along its leading edge 32, and in this thickening 31 there is a longitudinal opening or internal channel 33 of generally circular cross section, this channel 33 communicating through a longitudinal slot 34 with the space or chamber 35 within the extrusion.

A web 36 connects the side walls 37 of the extrusion 30. The web 36 gives to the extrusion 30 the necessary structural capacity by maintaining structural shape of the wall portions 38 which lie on opposite sides of the mouth of the channel 33. As shown in Fig. 4 a balancing rod 34 of the channel 33 is elastically bonded in the channel 33 as shown at 33'. Before the rod 40 is inserted it is coated with a thermosetting bonding agent and the wall surface of the opening 33 is also coated with the thermosetting bonding agent. After the rod 40 has been inserted the assembly is subjected to heat.

The rotor blade shown in Figs. 3 and 4 has root fittings 42 for connecting it to rotatable supporting means of an aerial vehicle. These root fittings 42 are connected to the section 30 by relatively small bolts 43 which pass through the upper and lower walls 37 of the fitting 30. The inner or leftward end of the balancing rod 40 is connected by a plurality of small rivets 44 with the metal 45 of the section 30 which lies between the leftward end of aerial rod 40 and the root fittings 42, so that tension in the rod 40 will be transmitted to the root fittings 42 and through them to the rotatable supporting means. A cap 47 is screwed onto the outer end of the rod 40 so as to limit rightward movement of the section 30 relative to the rod 40, and this cap 47 is covered by a fairing cap 48 which may be secured to the section 30 in a manner comparable to the securing of the cap 27 to the extrusion 14. At the inner end of the section 30 there is a cap member 49 which is secured by rivets 50 and at the inner end of the trailing edge 51 of the section 30 there are connector means 12', similar to the connector means 12 as shown in Fig. 1, containing a bolt hole 52 for connection of the trailing edge of the section 30 to a damping arm (not shown). The connecting means 12' comprises companion plates 53 secured by rivets 54 to the upper and lower faces of the inner end portion of the trailing section of the rotor blade.

Should failure of the extrusion 30 occur even as far to the left as the broken line *f—f* which extends through the rightward bolts 43, there would still be ample metal 45 between the rivets 44 and the remaining of the bolts 43 to connect the balancing rod 40 to the root fittings 42 which are in turn connected to the rotatable supporting means of the aircraft.

I claim:

1. In a rotor blade for connection to a supporting means carried by an aircraft: an extrusion of relatively lightweight metal forming an elongated hollow blade body having a thickened portion extending longitudinally of said extrusion between the leading edge thereof and the center of pressure thereof, the internal walls of said blade body being formed so as to define a channel extending along said thickened portion; a slender balancing rod member of high tensile strength substantially enclosed by the walls of said channel and extending therein from end to end of said blade; connector means attached directly to the root of said blade body for securing said blade body to said supporting means; and means to connect said slender member to said connector means and to said blade body so that said slender member may act in tension to carry centrifugal forces from the blade body to the connector means.

2. In a rotor blade for connection to a supporting means carried by an aircraft: an extrusion of relatively lightweight metal forming an elongated hollow blade body having a thickened portion extending longitudinally of said extrusion between the leading edge thereof and the center of pressure thereof, said thickened portion having a lengthwise opening therein; a slender member of high tensile strength extending in said opening of said thickened portion and being elastically bonded to said blade body; connector means for securing said blade body to said supporting means; and means to connect the inner end of said slender member to said connector means so that said slender member may act in tension to carry centrifugal forces from the blade body to the connector means.

3. In a rotor blade for connection to a supporting means carried by an aircraft: a hollow single piece extruded blade body of relatively lightweight material having a channel for a balancing rod extending lengthwise and along the leading edge thereof; connector means attached directly to the root end of said blade body for securing said blade body to said supporting means; a balancing rod disposed in said channel of said blade body and being connected thereto so that tensile forces may be transmitted from the blade body to said balancing rod; and means for mechanically connecting the inner end of said rod to said connector means so that said rod may act in tension to carry centrifugal forces from the blade to the connector means.

4. In a rotor blade for connection to a supporting means carried by an aircraft: a hollow blade body of relatively lightweight material having an internal channel for a balancing rod extending lengthwise and along the leading edge thereof; connector means attached directly to the root end of said body for securing said blade body to said supporting means; a balancing rod disposed in said channel of said blade body; means elastically bonding said balancing rod to the wall of said blade body defining said channel; and metallic means for connecting the inner end of said rod to said connector means so that said rod may act in tension to carry centrifugal forces from the blade to the connector means.

5. In a rotor blade for connection to a supporting means carried by an aircraft: a hollow body of relatively lightweight material forming the nose portion of the blade, said body having an internal channel for a balancing rod extending lengthwise and along the leading edge thereof; connector means attached directly to the root end of said body for securing said body to said supporting means; a balancing rod disposed in said channel of said body; means elastically bonding said balancing rod to the wall of said body defining said channel; and metallic means for connecting the inner end of said rod to said connector means so that said rod may act in tension to carry centrifugal forces from the body to the connector means.

6. In a rotor blade, a blade body comprising an integral, hollow, lightweight metal extrusion having integral leading and trailing edges, said leading edge having an internal thickened portion having an internal channel therein spaced rearwardly from the leading edge of the blade body and extending longitudinally of the blade body, a tension and balancing rod member within said channel and extending longitudinally thereof, means connecting the inner end of said rod member to the inner end of said blade body, the outer end of said blade body forming a radial outwardly facing shoulder around said channel and the outer end of said rod member having a radial inwardly facing shoulder thereon engaging said outwardly facing shoulder upon the blade body and maintaining said rod member in tension.

References Cited in the file of this patent

UNITED STATES PATENTS

| | | |
|---|---|---|
| 2,152,861 | Bennett | Apr. 4, 1939 |
| 2,254,821 | Haw | Sept. 2, 1941 |
| 2,265,366 | Hafner | Dec. 9, 1941 |

(Other references on following page)

UNITED STATES PATENTS

| | | |
|---|---|---|
| 2,303,707 | Pullin | Dec. 1, 1942 |
| 2,312,095 | Welty | Feb. 23, 1943 |
| 2,465,007 | Bragdon | Mar. 22, 1949 |
| 2,469,480 | Sikorsky | May 10, 1949 |
| 2,475,337 | Platt | July 5, 1949 |
| 2,509,184 | Brantly | May 23, 1950 |
| 2,566,701 | Griese | Sept. 4, 1951 |
| 2,568,230 | Gluhareff | Sept. 18, 1951 |
| 2,580,363 | Schnitt | Dec. 25, 1951 |

FOREIGN PATENTS

| | | |
|---|---|---|
| 357,081 | Great Britain | Sept. 4, 1931 |